(12) United States Patent
Yuan

(10) Patent No.: US 11,082,677 B2
(45) Date of Patent: Aug. 3, 2021

(54) WHITE BALANCE PROCESSING METHOD AND APPARATUS

(71) Applicant: GUANGDONG OPPO MOBILE TELECOMMUNICATIONS CORP., LTD., Guangdong (CN)

(72) Inventor: Quan Yuan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/727,646

(22) Filed: Dec. 26, 2019

(65) Prior Publication Data

US 2020/0137369 A1 Apr. 30, 2020

Related U.S. Application Data

(63) Continuation of application No. PCT/CN2018/094084, filed on Jul. 2, 2018.

(30) Foreign Application Priority Data

Jul. 10, 2017 (CN) .......................... 201710557602.0

(51) Int. Cl.
*H04N 9/73* (2006.01)
*G06T 7/521* (2017.01)
*G06T 7/90* (2017.01)
*G06K 9/00* (2006.01)

(52) U.S. Cl.
CPC .......... *H04N 9/735* (2013.01); *G06K 9/00281* (2013.01); *G06T 7/521* (2017.01); *G06T 7/90* (2017.01); *G06T 2207/30201* (2013.01)

(58) Field of Classification Search
CPC ........... H04N 9/735; G06T 7/521; G06T 7/90; G06K 9/00281
USPC ....................................................... 348/223.1
See application file for complete search history.

(56) References Cited

U.S. PATENT DOCUMENTS

| 8,013,906 B2 | 9/2011 | Ikeda |
| 8,089,525 B2 | 1/2012 | Takayama |
| 8,514,297 B2 | 8/2013 | Ikeda |
| 2006/0171605 A1 | 8/2006 | Watanabe |
| 2006/0284991 A1 | 12/2006 | Ikeda |
| 2007/0031060 A1 | 2/2007 | Okada |

(Continued)

FOREIGN PATENT DOCUMENTS

| CN | 1663287 A | 8/2005 |
| CN | 1885952 A | 12/2006 |

(Continued)

OTHER PUBLICATIONS

International Search Report in the international application No. PCT/CN2018/094084, dated Sep. 13, 2018.

(Continued)

*Primary Examiner* — Stephen P Coleman
(74) *Attorney, Agent, or Firm* — Ladas & Parry LLP

(57) ABSTRACT

A white balance processing method and apparatus are provided. The method comprises: imaging a living paragraphed object to obtain an image; obtaining a white balance gain value according to the area occupied by a target region containing a human face in the image; and performing white balance processing on the image according to the white balance gain value.

14 Claims, 5 Drawing Sheets

(56) References Cited

U.S. PATENT DOCUMENTS

| | | | |
|---|---|---|---|
| 2008/0192980 A1* | 8/2008 | Park | G07C 9/37 382/103 |
| 2009/0034837 A1* | 2/2009 | Kato | H04N 1/608 382/167 |
| 2009/0167892 A1 | 7/2009 | Takayama | |
| 2011/0205391 A1* | 8/2011 | Ikeda | H04N 1/6027 348/223.1 |
| 2012/0092523 A1 | 4/2012 | Nakamura | |

FOREIGN PATENT DOCUMENTS

| | | | |
|---|---|---|---|
| CN | 101472188 A | 7/2009 | |
| CN | 101527860 A | 9/2009 | |
| CN | 101753812 A | 6/2010 | |
| CN | 103905804 A | 7/2014 | |
| CN | 104751110 A | 7/2015 | |
| CN | 105956518 A | 9/2016 | |
| CN | 106529379 A | 3/2017 | |
| CN | 106548121 A | 3/2017 | |
| CN | 107277479 A | 10/2017 | |
| EP | 1737247 A2 | 12/2006 | |
| EP | 1905350 A1 | 4/2008 | |
| JP | 2014209681 A | 11/2014 | |
| JP | 2015198438 A | 11/2015 | |
| WO | 2016070300 A1 | 5/2016 | |
| WO | WO-2016070300 A1 * | 5/2016 | G06K 9/00288 |

OTHER PUBLICATIONS

First Office Action of the Chinese application No. 201710557602.0, dated Sep. 6, 2018.
Supplementary European Search Report in the European application No. 18831888.5, dated Jun. 24, 2020.
English Translation of the Written Opinion of the International Search Authority in the international application No. Drp, dated Sep. 13, 2018.
First Office Action of the European application No. 18831888.5, dated Dec. 18, 2020.
Office Action of the Indian application No. 202017002968, dated Mar. 19, 2021.

* cited by examiner

WHITE BALANCE PROCESSING METHOD AND APPARATUS

CROSS-REFERENCE TO RELATED APPLICATIONS

This is a continuation application of International Application No. PCT/CN2018/094084 filed on Jul. 2, 2018, which claims priority to Chinese Patent Application No. 201710557602.0, filed by Guangdong OPPO Mobile Telecommunications Corp. Ltd. on Jul. 10, 2017 and entitled "White Balance Processing Method and Apparatus", the contents of these applications are hereby incorporated by reference in their entireties.

TECHNICAL FIELD

The disclosure relates to the technical field of mobile terminals, and particularly to a white balance processing method and device.

BACKGROUND

Along with the progress of sciences and technologies and development of image processing technologies, photographing technologies for mobile terminals (for example, smart phones and personal digital assistants) have also changed rapidly, including image processing software for processing Automatic White Balance (AWB) as well as automatic white balance for a face, i.e., FACE AWB.

However, in a related art, a FACE AWB algorithm is started to perform white balance regulation on an image upon a camera detects a face, which may result in the problems of inaccurate image white balance regulation, color cast and poor user experience.

BRIEF DESCRIPTION OF DRAWINGS

The abovementioned and/or additional aspects and advantages of the disclosure will become apparent and easy to understand from the descriptions made to the embodiments below in combination with the drawings.

DETAILED DESCRIPTION

Figure 1:
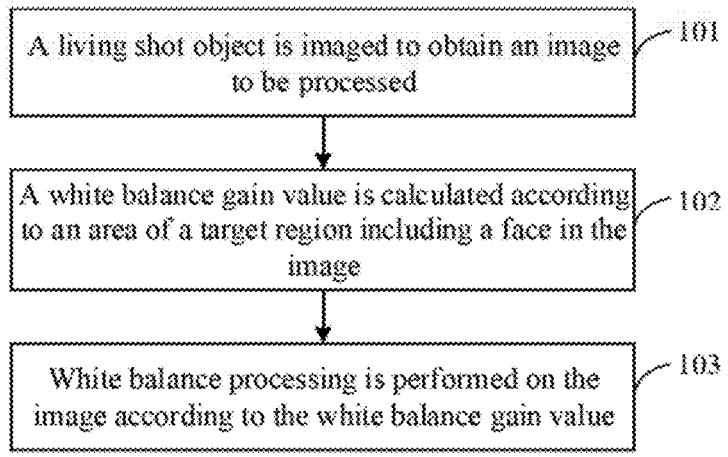
FIG. 1 is a schematic flowchart of a white balance processing method according to an embodiment of the disclosure.

The embodiments of the disclosure will be described below in detail. Examples of the embodiments are illustrated in the drawings and the same or similar reference signs always represent the same or similar components or components with the same or similar functions. The embodiments described below with reference to the drawings are exemplary and intended to explain the disclosure and should not be understood as limits to the disclosure.

The disclosure is intended to solve one of the abovementioned technical problems in the related art at least to a certain extent.

To this end, the disclosure discloses a white balance processing method, which solves the problems of inaccurate image white balance regulation, color cast and poor user experience caused by the fact that a living body-based FACE AWB is started to regulate an image responsive to detecting that a non-living shot object includes a face.

The disclosure also discloses a white balance processing device.

The disclosure also discloses a computer device.

The disclosure also discloses a computer-readable storage medium.

The disclosure also discloses a computer program product.

A first aspect of embodiments of the disclosure discloses a white balance processing method, which may include the following operations.

A living shot object is imaged to obtain an image.

A white balance gain value is obtained according to an area of a target region including a face in the image.

White balance processing is performed on the image according to the white balance gain value.

In the white balance processing method according to the embodiments of the disclosure, the living shot object is imaged to obtain the image to be processed, the white balance gain value is calculated according to the area occupied by the target region including the face in the image, the target region including the face region or the portrait region, and white balance processing is performed on the image according to the white balance gain value. Living body recognition is performed on a human body, so as to solve the problems of inaccurate image white balance regulation, color cast and poor user experience caused by the fact that a living body-based FACE AWB is started to regulate an image responsive to detecting that a non-living shot object includes a face.

A second aspect of the embodiments of the disclosure discloses a white balance processing device, which may include an imaging module, a calculation module and a white balance module.

The imaging module may be configured to image a living shot object to obtain an image.

The calculation module may be configured to obtain a white balance gain value according to an area of a target region including a face in the image.

The white balance module may be configured to perform white balance processing on the image according to the white balance gain value.

In the white balance processing device according to the embodiments of the disclosure, the imaging module is configured to image the living shot object to obtain the image to be processed, the calculation module is configured to calculate the white balance gain value according to the area occupied by the target region including the face in the image, and the white balance module is configured to perform white balance processing on the image according to the white balance gain value. Living body recognition is performed on a human body, so as to solve the problems of inaccurate image white balance regulation, color cast and poor user experience caused by the fact that a living body-based FACE AWB is started to regulate an image responsive to detecting that a non-living shot object includes a face.

A third aspect of the embodiments of the disclosure discloses a computer device, which may include a memory, a processor and a computer program stored in the memory and capable of running in the processor. The processor executes the program to implement the white balance processing method of the first aspect of the embodiments.

A fourth aspect of the embodiments of the disclosure discloses a computer-readable storage medium, in which a computer program may be stored. The program is executed by a processor to implement the white balance processing method of the first aspect of the embodiments.

A fifth aspect of the embodiments of the disclosure discloses a computer program product. An instruction in the program product is executed by a processor to execute the white balance processing method of the first aspect of the embodiments.

Additional aspects and advantages of the disclosure will be partially presented in the following descriptions and partially become apparent from the following descriptions or understood by implementing the disclosure.

A white balance processing method and device of the embodiments of the disclosure will be described below with reference to the drawings.

FIG. 1 is a schematic flowchart of a white balance processing method according to an embodiment of the disclosure. As illustrated in FIG. 1, the method includes the following operations.

In 101, a living shot object is imaged to obtain an image to be processed.

Specifically, before the shot object is shot and imaged, it is necessary to determine whether the shot object is a living body at first, namely determining whether the shot object is not a still three-dimensional doll or plane image including a face but a living person. The living shot object is imaged to obtain the image that requires the white balance processing.

It is to be noted that a camera may be a dual camera, a depth camera (Red-Green-Blue Depth (RGBD) camera), a structured light or Time of Flight (TOF) camera, which will not be enumerated herein. Through these cameras, not only may imaging information of a shot object be obtained, but also depth information of the shot object may be obtained.

In 102, a white balance gain value is calculated according to an area of a target region including a face in the image.

The target region includes a face region or a portrait region.

Specifically, an area proportion of the target region in the image is calculated according to the area occupied by the target region in the image. A first gain value and second gain value of each color component are calculated according to the area proportion to obtain the white balance gain value. The first gain value is used to regulate the face in the image to a skin color. The second gain value is different from the first gain value, and the second gain value is a gain value determined according to the portrait region to regulate white balance and is calculated according to each color component in the portrait region.

In 103, white balance processing is performed on the image according to the white balance gain value.

Specifically, Red (R) value and Blue (B) value data of each regulated pixel are calculated according to the calculated target white balance gain value, thereby achieving color correction.

It is to be noted that, since a human eye is most sensitive to light with a Green (G) light wavelength (480 nm-600 nm) in a frequency spectrum and the number of green pixels acquired in a Bayer array is greatest, a present camera usually fixes a gain value of a component G and then regulates gain values of a component R and a component B to regulate the component R and the component B respectively.

In the white balance processing method of the embodiment of the disclosure, the living shot object is imaged to obtain the image to be processed, the white balance gain value is calculated according to the area occupied by the target region including the face in the image, the target region including the face region or the portrait region, and white balance processing is performed on the image according to the white balance gain value. Living body recognition is performed on a human body, so as to solve the problems of inaccurate image white balance regulation, color cast and poor user experience caused by the fact that a living body-based FACE AWB is started to regulate an image responsive to detecting that a non-living shot object includes a face.

Figure 2:
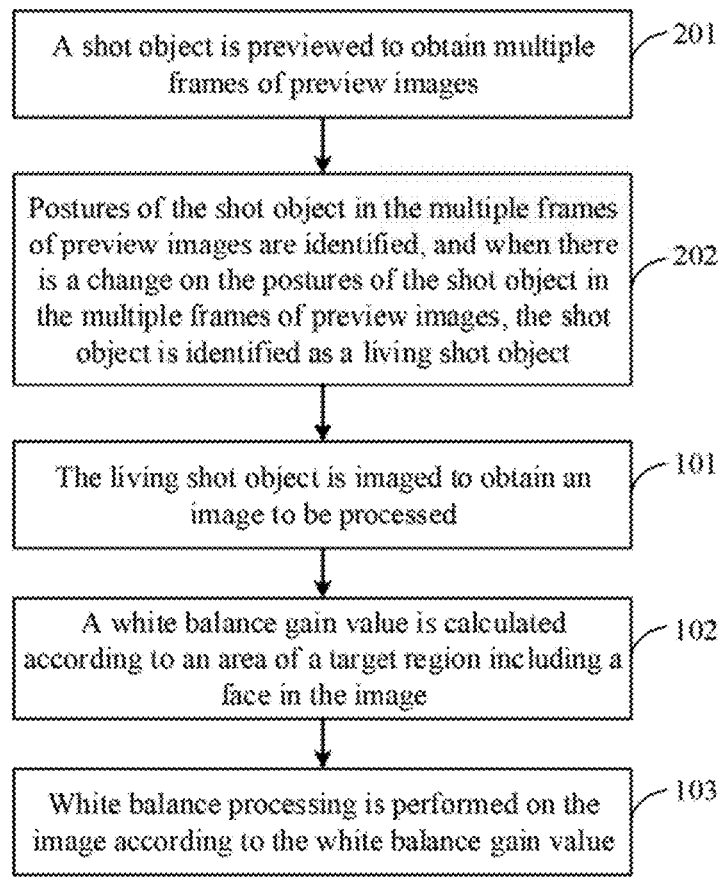
FIG. 2 is a schematic flowchart of another white balance processing method according to an embodiment of the disclosure.

Based on the above embodiments, before the shot object is required to be imaged, it is necessary to perform living body recognition on the shot object. Therefore, the disclosure discloses another possible white balance processing method. FIG. 2 is a schematic flowchart of another white balance processing method according to an embodiment of the disclosure. A method for performing living body recognition on the shot object is further described clearly. As illustrated in FIG. 2, before the operation in 101, the method may further include the following operations.

In 201, the shot object is previewed to obtain multiple frames of preview images.

Specifically, after the camera is turned on, the camera acquires images in a preview mode, and the images acquired by the camera are recorded in units of frames to obtain the multiple frames of preview images at different time.

A frame is a single video image of a minimum unit in a video animation, namely a frame is a still image.

It is to be noted that the multiple frames of preview images obtained by previewing contain imaging time information.

In 202, postures of the shot object in the multiple frames of preview images are identified, and when there is a change on the postures of the shot object in the multiple frames of preview images, the shot object is identified as a living shot object.

Specifically, for each frame of preview image, an edge of a body structure of the shot object is rendered. The body structure includes at least one of a mouse, eyes, arms, legs, hands or feet. The posture of the shot object is identified according to the rendered edge.

As a possible implementation mode, the multiple frames of preview images obtained by previewing contain time information, and the multiple frames of preview images are sequentially numbered in ascending order according to an acquisition time sequence of the multiple frames of preview images, for example, the number of the first frame of image is 1, the number of the second frame of image is 2, . . . , then positions of the rendered edges of the body structure in the multiple frames of preview images are sequentially compared according to the numbers. When the position of the edge of the body structure obviously changes, it is indicated that the posture of the shot object changes, thereby identifying the shot object to be living.

Before the operation in 202, the method further includes the following operations. Depth information of at least one frame of preview image is acquired, and it is identified whether the shot object is in a plane form or a three-dimensional form according to the depth information.

This is because, when the shot object is in the plane form, it is indicated that the shot object is non-living and, for example, may be a plane image of a portrait, while a face skin color of a non-living body is greatly different from a face skin color of a living body and adopting a living body-based FACE AWB algorithm for the non-living body may not obtain an accurate calculation result and, for example, may make a black-and-white image obviously red when being displayed on a computer. When the shot object is in the three-dimensional form, through the operations in 201 and 202, it may further be identified whether the shot object is a living body, and when the shot object is a living body, namely the shot object is a living person, the FACE AWB algorithm for a living body may be adopted for white balance regulation.

Specifically, all the multiple frames of images obtained by previewing include depth information of pixels, and the depth information of all the pixels in the at least one frame of preview image is acquired. As a possible implementation mode, an average value of the depth information of a small part of pixels is calculated according to the obtained depth information of all the pixels, and the depth information of the other pixels is compared with the average value respectively. When the difference values are less than a preset threshold, it is determined that all the pixels are on the same plane, and thus the shot object is identified to be in the plane form; and when a difference value is more than or equal to the preset threshold, it is determined that the shot object is in the three-dimensional form.

It is to be noted that the preset threshold may be calculated by statistics on samples and may be set by those skilled in the art according to a specific circumstance.

In the white balance processing method of the embodiment of the disclosure, the living shot object is imaged to obtain the image to be processed, the white balance gain value is calculated according to the area occupied by the target region including the face in the image, the target region including the face region or the portrait region, and white balance processing is performed on the image according to the white balance gain value. Living body recognition is performed on a human body, so as to solve the problems of inaccurate image white balance regulation, color cast and poor user experience caused by the fact that a living body-based FACE AWB is started to regulate an image responsive to detecting that a non-living shot object includes a face.

Figure 3:
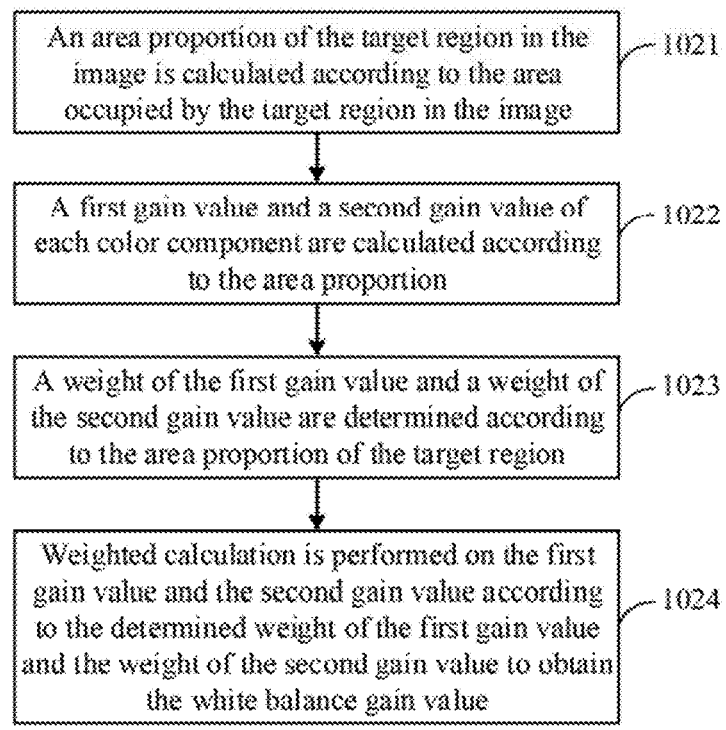
FIG. 3 is a schematic flowchart of another white balance processing method according to an embodiment of the disclosure.

Based on the abovementioned embodiment, the embodiment also provides another white balance processing method. FIG. 3 is a flowchart of another white balance processing method according to an embodiment of the disclosure. Based on the operation in 102, a method for calculating the white balance gain value of the image is explained more clearly. As illustrated in FIG. 3, the operation in 102 may further include the following actions.

In 1021, an area proportion of the target region in the image is calculated according to the area occupied by the target region in the image.

Specifically, the target region is the face region or the portrait region. The areas occupied by the face region and the portrait region in the image may be calculated to further calculate area proportions of the face region and the portrait region in the image.

Specifically, there are multiple possible implementation modes for calculating the area occupied by the target region in the image. As a possible implementation mode, the image is divided into multiple sub-blocks, and each sub-block has the same area. For example, a target picture is divided into m*n sub-blocks, a length of each sub-block is 1/m of a length of the target picture, and a width of each sub-block is 1/n of a width of the target picture. Therefore, an area of each sub-block is 1/m*n, where m and n are positive integers, and preferably, m is 9 and n is 7.

Furthermore, the acquired m*n sub-blocks are searched for sub-blocks in a coordinate interval of the face region and sub-blocks including an edge of the coordinate interval of the face region to obtain all the sub-blocks in the face region. An area of each sub-block is known, so that the area of the face region may be calculated.

All sub-blocks in the portrait region may be found by the same method. An area of each sub-block is known, so that the area occupied by the portrait region in the image may be calculated.

A quotient obtained by dividing the area occupied by the target region by a total area of the image is the area proportion of the target region.

In 1022, a first gain value and a second gain value of each color component are calculated according to the area proportion.

The first gain value is used to regulate the face in the image to the skin color.

Specifically, it is determined whether the skin color of the face in the image is a normal face skin color, and if the skin color of the face in the image is not a normal skin color, the first gain value capable of regulating the skin color of the face to the normal skin color is generated.

As a possible implementation mode, color components of all the pixels of the face region are acquired, a color of each pixel is represented by a color component (R, G, B), and the color vectors of each pixel may be averaged to calculate a color vector corresponding to the skin color of the face. It is determined whether R, G and B values corresponding to the skin color of the face are within the range of R, G and B values corresponding to the normal face skin color. When R, G and B values corresponding to the skin color of the face are not within the range of R. G and B values corresponding to the normal face skin color, the R, G and B values corresponding to the skin color of the face are adjusted through a gain value to be within the range of R. G and B values corresponding to the normal face skin color, and the gain value is the first gain value.

The range of R, G and B values corresponding to the normal face skin color may be determined according to R, G and B values provided in a color matrix CC. The R, G and B values in the color matrix CC may be obtained according to a CIE color space provided by the Commission Internationale de L'Eclairage.

The second gain value is different from the first gain value. The second gain value refers to a gain value determined according to the portrait region to adjust white balance and is calculated according to each color component in the portrait region.

As a possible implementation mode, when a color change in the colors of the image is enough, an average value of the three components R, G and B in the color vectors of all the pixels tends to be balanced (1:1:1), and a relatively accurate white balance gain value, i.e., the second gain value, may be obtained by a grayscale weighting algorithm.

Specifically, the portrait region is divided into a plurality of sub-blocks, color vectors of all pixels in each sub-block are acquired, and each pixel is represented by a color vector (R, G, B). Then an average value and standard deviation of three channels R, G and B in each sub-block are calculated, and the standard deviation of each sub-block is weighted (the low-correlated sub-blocks are discarded and the high-correlated sub-blocks are reserved) to reduce influence of a large-area single color and make the image colorful. An average value of the three channels R, G and B weighted with the standard deviation is further calculated, and a gain coefficient of the three channels R, G and B is calculated to obtain the second gain value.

In 1023, a weight of the first gain value and a weight of the second gain value are determined according to the area proportion of the target region.

Specifically, it is necessary to determine whether the target region is the face region or the portrait region.

As a possible implementation mode, it is determined whether the area occupied by the face region is less than a preset threshold to determine whether the target region is the face region. That is, when the area occupied by the face region is less than the preset threshold, the target region is the portrait region; otherwise, the target region is the face region.

This is because, when the face region is relatively small, if the weights of the first gain value and the second gain value are regulated based on the area occupied by the face region in the image, a face skin color regulation does not have a significant effect. The portrait region includes the face region and a body region and thus occupies an area larger than the area of the face region, and when it is determined that the area occupied by the face region in the image is less than the preset area threshold, it is necessary to adopt a calculation manner of calculating the target white balance gain value based on the area proportion of the portrait region in the image instead. On the contrary, if the face region is relatively large, the target white balance gain value calculated by adjusting the weights of the first gain value and the second gain value based on the area proportion of the face region in the image is also relatively accurate.

Specifically, for convenient description, the weight of the first gain value is set to be K, and the weight of the second gain value is determined to be 1-K. A value of K is determined according to the area proportion of the target region. In general, the area proportion is positively correlated to the value of K.

In 1024, weighted calculation is performed on the first gain value and the second gain value according to the determined weight of the first gain value and the weight of the second gain value to obtain the white balance gain value.

Specifically, the first gain value and the second gain value are multiplied by the respective weights to calculate the white balance gain value, namely the white balance gain value=the first gain value*K+the second gain value*(1-K).

In the white balance processing method of the embodiment of the disclosure, the living shot object is imaged to obtain the image to be processed, the white balance gain value is calculated according to the area occupied by the target region including the face in the image, the target region including the face region or the portrait region, and white balance processing is performed on the image according to the white balance gain value. Living body recognition is performed on a human body, so as to solve the problems of inaccurate image white balance regulation, color cast and poor user experience caused by the fact that a living body-based FACE AWB is started to regulate an image responsive to detecting that a non-living shot object includes a face.

For implementing the abovementioned embodiments, the disclosure also discloses a white balance processing device.

Figure 4:
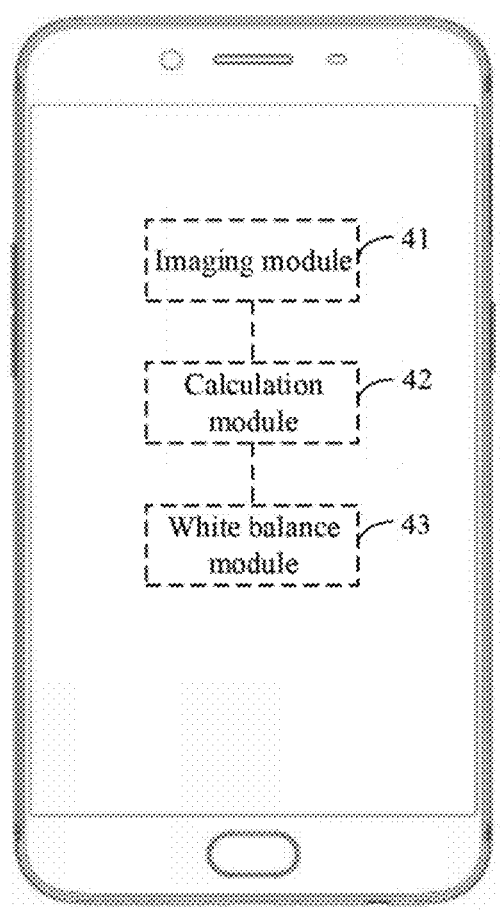
FIG. 4 is a structure diagram of a white balance processing device according to an embodiment of the disclosure.

FIG. 4 is a structure diagram of a white balance processing device according to an embodiment of the disclosure. As illustrated in FIG. 4, the device includes an imaging module 41, a calculation module 42 and a white balance module 43.

The imaging module 41 is configured to image a living shot object to obtain an image to be processed.

The calculation module 42 is configured to calculate a white balance gain value according to an area of a target region including a face in the image. The target region includes a face region or a portrait region.

The white balance module 43 is configured to perform white balance processing on the image according to the white balance gain value.

It is to be noted that the above explanations and descriptions about the method embodiments are also applied to the device of the embodiment and will not be elaborated herein.

In the white balance processing device of the embodiment of the disclosure, the imaging module is configured to image the living shot object to obtain the image to be processed, the calculation module is configured to calculate the white balance gain value according to the area occupied by the target region including the face in the image, and the white balance module is configured to perform white balance processing on the image according to the white balance gain value. Living body recognition is performed on a human body, so as to solve the problems of inaccurate image white balance regulation, color cast and poor user experience caused by the fact that a living FACE AWB is started to regulate an image responsive to detecting that a non-living shot object includes a face.

Figure 5:
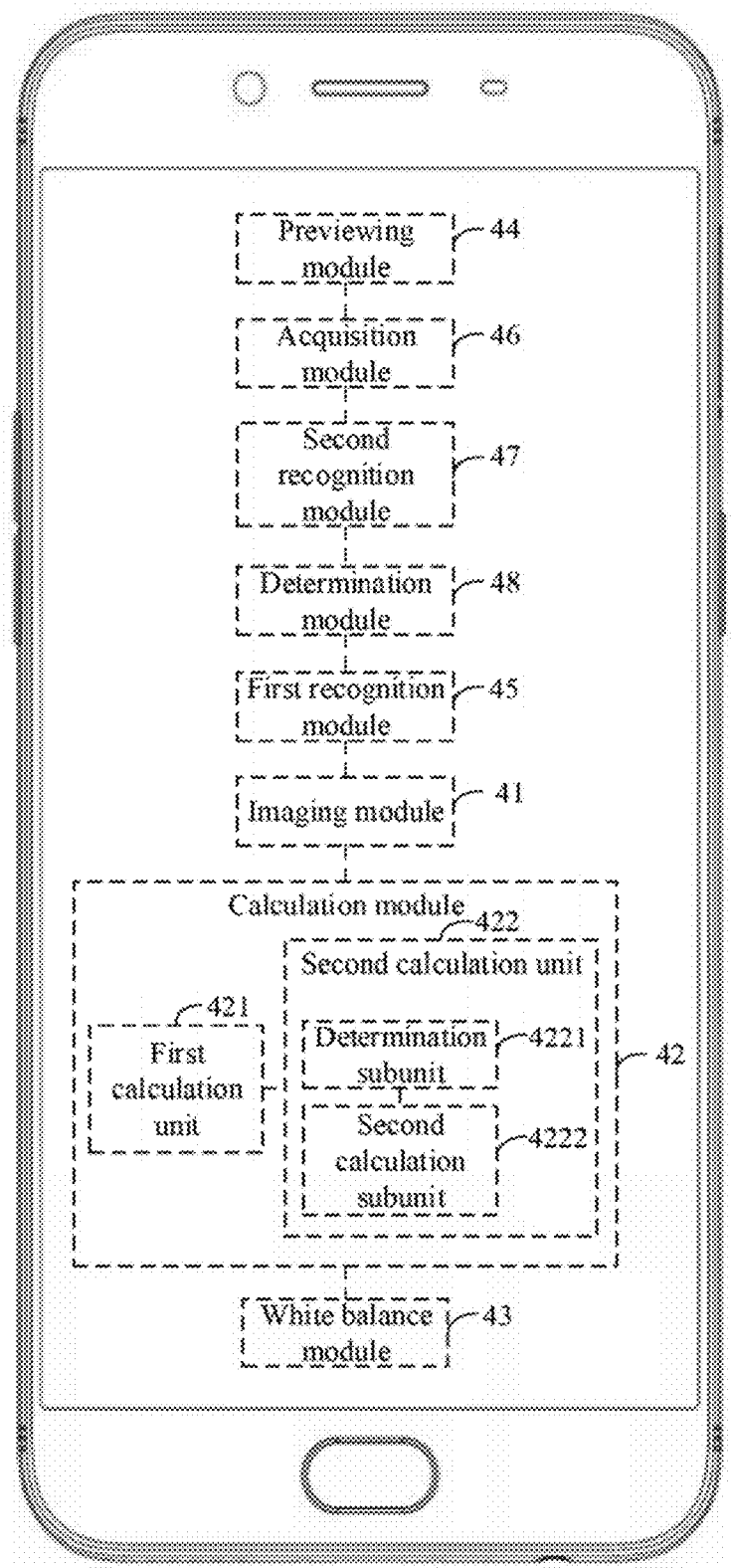
FIG. 5 is a structure diagram of another white balance processing device according to an embodiment of the disclosure.

Based on the abovementioned embodiments, the embodiment of the disclosure also provides a possible implementation mode of a white balance processing device. FIG. 5 is a structure diagram of another white balance processing device according to an embodiment of the disclosure. Based on the previous embodiment, as illustrated in FIG. 5, the device further includes a previewing module 44, a first recognition module 45, an acquisition module 46, a second recognition module 47 and a determination module 48.

The previewing module 44 is configured to preview the shot object to obtain multiple frames of preview images.

The first recognition module 45 is configured to identify postures of the shot object in the multiple frames of preview images and identify, when there is a change on the postures of the shot object in the multiple frames of preview images, the shot object as a living shot object.

The acquisition module 46 is configured to acquire depth information of at least one frame of preview image.

The second recognition module 47 is configured to identify whether the shot object is in a plane form according to the depth information.

The determination module 48 is configured to determine that the shot object is in a three-dimensional form.

As a possible implementation mode, the acquisition module 46 may specifically be configured to perform synchronization imaging between a structured light camera or a depth camera and a camera for capturing the preview image to obtain the depth information of the preview image.

As a possible implementation mode, the calculation module 42 may further include a first calculation unit 421 and a second calculation unit 422.

The first calculation unit 421 is configured to calculate an area proportion of the target region in the image according to the area occupied by the target region in the image.

The second calculation unit 422 is configured to calculate a first gain value and a second gain value of each color component according to the area proportion to obtain the white balance gain value. The first gain value is used to regulate the face in the image to a skin color and the second gain value is different from the first gain value.

As a possible implementation mode, the second calculation unit 422 may further include a first determination subunit 4221 and a second calculation subunit 4222.

The determination subunit 4221 is configured to determine a weight of the first gain value and a weight of the second gain value according to the area proportion.

The second calculation subunit 4222 is configured to perform weighted calculation on the first gain value and the second gain value according to the determined weight of the first gain value and the weight of the second gain value to obtain the white balance gain value.

As a possible implementation mode, the calculation module 42 may further include a determination unit.

The determination unit is configured to determine, when an area occupied by the face region in the image is not less than a preset area threshold, the face region as the target region.

As a possible implementation mode, the determination unit is further configured to determine, when the area occupied by the face region in the image is less than the preset area threshold, the portrait region as the target region.

It is to be noted that the above explanations and descriptions about the method embodiments are also applied to the device of the embodiment and will not be elaborated herein.

In the white balance processing device of the embodiment of the disclosure, the imaging module is configured to image the living shot object to obtain the image to be processed, the calculation module is configured to calculate the white balance gain value according to the area occupied by the target region including the face in the image, and the white balance module is configured to perform white balance processing on the image according to the white balance gain value. Living body recognition is performed on a human body, so as to solve the problems of inaccurate image white balance regulation, color cast and poor user experience caused by the fact that a living FACE AWB is started to regulate an image responsive to detecting that a non-living shot object includes a face.

For implementing the abovementioned embodiments, the disclosure also discloses a computer device, which includes a memory, a processor and a computer program stored in the memory and capable of running in the processor. The processor executes the program to implement the white balance processing method of the method embodiments.

Figure 6:
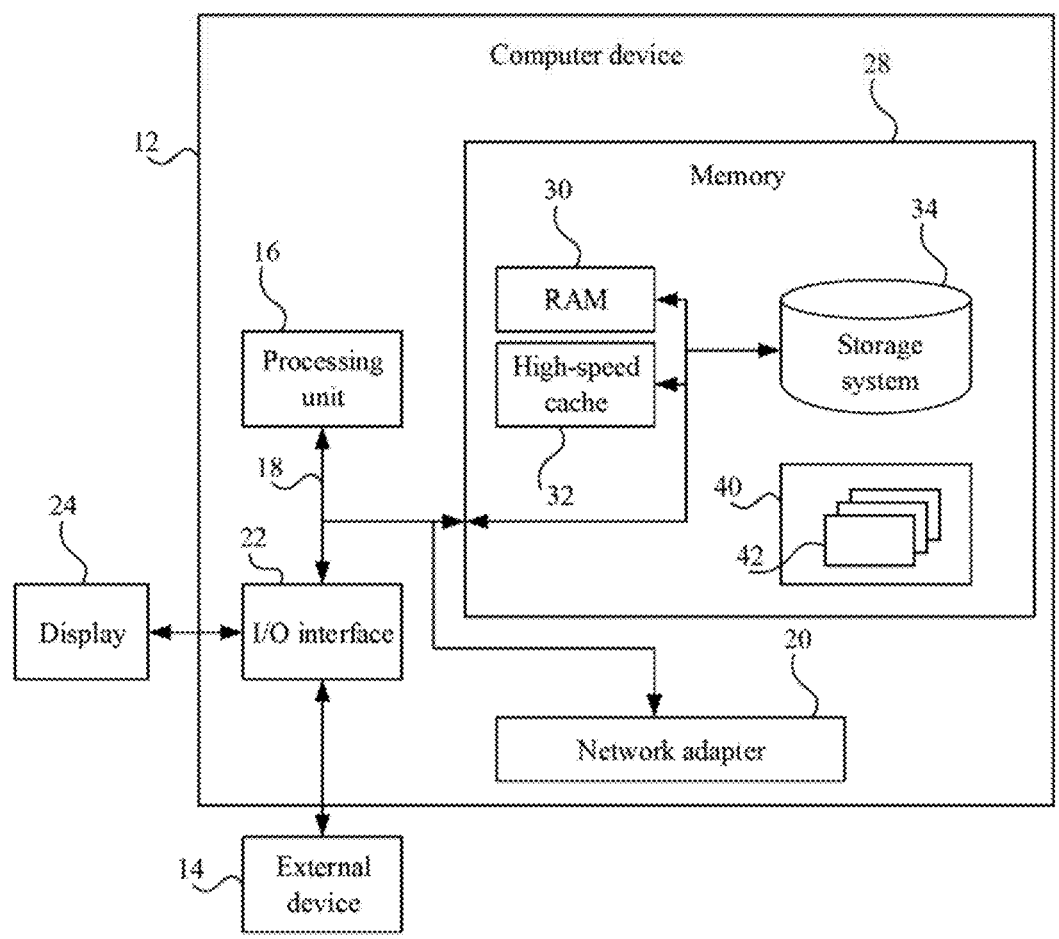
FIG. 6 is a block diagram of an exemplary computer device suitable for implementing implementation modes of the disclosure.

FIG. 6 is a block diagram of an exemplary computer device suitable for implementing implementation modes of the disclosure. The computer device 12 illustrated in FIG. 6 is only an example and should not form any limit to the functions and scope of application of the embodiments of the disclosure.

As illustrated in FIG. 6, the computer device 12 is embodied in form of a universal computer device. Components of the computer device 12 may include, but not limited to: one or more processors or processing units 16, a system memory 28 and a bus 18 connecting different system components (including the system memory 28 and the processing unit 16).

The bus 18 represents one or more of several types of bus structures, including a memory bus or memory controller, a peripheral bus, an accelerated graphics port, a processor or a local bus adopting any bus structure in multiple bus structures. For example, these system structures include, but not limited to, an Industry Standard Architecture (ISA) bus, a Micro Channel Architecture (MAC) bus, an enhanced ISA bus, a Video Electronics Standards Association (VESA) local bus and a Peripheral Component Interconnection (PCI) bus.

The computer device 12 typically includes multiple computer system-readable media. These media may be any available medium that the computer device 12 may access, including volatile and nonvolatile media and movable and immovable media.

The memory 28 may include a computer system-readable medium in form of a nonvolatile memory, for example, a Random Access Memory (RAM) 30 and/or a high-speed cache memory 32. The computer device 12 may further include another movable/immovable and volatile/nonvolatile computer system storage medium. Only as an example, a storage system 34 may be configured to read and write an immovable and nonvolatile magnetic medium (not illustrated in FIG. 6 and usually called a "hard disk drive"). Although not illustrated in FIG. 6, a magnetic disk drive configured to read and write a movable nonvolatile magnetic disk (for example, a "floppy disk") and an optical disk drive configured to read and write a movable nonvolatile optical disk (for example, a Compact Disc Read Only Memory (CD-ROM), a Digital Video Disc Read Only Memory (DVD-ROM) or another optical medium) may be provided. Under such circumstances, each drive may be connected with the bus 18 through one or more data medium interfaces. The memory 28 may include at least one program product. The program product includes a group of (for example, at least one) program modules, and these program modules are configured to execute the functions of each embodiment of the disclosure.

A program/utility tool 40 with a group of (at least one) program modules 42 may be stored in, for example, the memory 28. Such a program module 42 includes, but not limited to, an operating system, one or more application programs, another program module and program data, and each or certain combination of these examples may include implementation of a network environment. The program module 42 usually executes the functions and/or method in the embodiments described in the disclosure.

The computer device 12 may also communicate with one or more external devices 14 (for example, a keyboard, a pointing device and a display 24), and may further communicate with one or more devices through which a user may interact with the computer device 12 and/or communicate with any device (for example, a network card and a modem) through which the computer device 12 may communicate with one or more other computer devices. Such communication may be implemented through an Input/Output (I/O) interface 22. Moreover, the computer device 12 may further communicate with one or more networks (for example, a Local Area Network (LAN) and a Wide Area Network (WAN) and/or public network, for example, the Internet) through a network adapter 20. As illustrated in FIG. 6, the network adapter 20 communicates with the other modules of the computer device 12 through the bus 18. It is to be understood that, although not illustrated in the figure, other hardware and/or software modules may be used in combination with the computer device 12, including, but not limited to, a microcode, a device driver, a redundant processing unit, an external disk drive array, a Redundant Array of Independent Disks (RAID) system, a magnetic tape drive, a data backup storage system and the like.

The processing unit 16 runs the program stored in the system memory 28, to execute various function applications and data processing, for example, implementing the method mentioned in the abovementioned embodiments.

For implementing the abovementioned embodiments, the disclosure also discloses a computer-readable storage medium, in which a computer program is stored. The program is executed by a processor to implement the white balance processing method in the abovementioned method embodiments.

For implementing the abovementioned embodiments, the disclosure also discloses a computer program product. An instruction in the computer program product is executed by a processor to implement the white balance processing method in the abovementioned method embodiments.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the disclosure. In the specification, these terms are not always schematically expressed for the same embodiment or example. The specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or operations of the process and, moreover, the scope of the preferred implementation mode of the disclosure includes other implementation, not in a sequence illustrated or discussed herein, including execution of the functions basically simultaneously or in an opposite sequence according to the involved functions. This should be understood by those skilled in the art of the embodiments of the disclosure.

Logics and/or operations represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), an RAM, a Read-Only Memory (ROM), an Erasable Programmable ROM (EPROM) (or flash memory), an optical fiber device and a portable CD-ROM. In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It is to be understood that each part of the disclosure may be implemented by hardware, software, firmware or a combination thereof. In the abovementioned implementation modes, multiple operations or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an application-specific integrated circuit with a proper combined logic gate circuit, a Programmable Gate Array (PGA), a Field Programmable Gate Army (FPGA) and the like.

Those of ordinary skill in the art should understand that all or part of the operations in the method of the abovementioned embodiment may be completed through related hardware instructed by a program. The program may be stored in a computer-readable storage medium, and when the program is executed, one or combination of the operations of the method embodiments is included.

In addition, each functional unit in each embodiment of the disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a ROM, a magnetic disk, an optical disk or the like. The embodiments of the disclosure have been illustrated or described above. It can be understood that the abovementioned embodiments are exemplary and should not be understood as limits to the disclosure and those of ordinary skill in the art may make variations, modifications, replacements, transformations to the abovementioned embodiments within the scope of the disclosure.

The invention claimed is:

1. A white balance processing method, comprising:
imaging a living shot object to obtain an image;
obtaining a white balance gain value according to an area of a target region comprising a face in the image; and
performing white balance processing on the image according to the white balance gain value, wherein obtaining the white balance gain value according to the area of the target region comprising the face in the image comprises:
determining, when an area occupied by a face region in the image is not less than a preset area threshold, the face region as the target region; or determining, when the area occupied by the face region in the image is less than the preset area threshold, a portrait region as the target region;
calculating an area proportion of the target region in the image according to the area occupied by the target region in the image; and
calculating a first gain value and a second gain value of each color component according to the area proportion to obtain the white balance gain value, the first gain value being used to regulate the face in the image to a skin color and the second gain value being different from the first gain value.

2. The white balance processing method of claim 1, wherein before imaging the living shot object to obtain the image, the method further comprises:
previewing the shot object to obtain multiple frames of preview images;
identifying postures of the shot object in the multiple frames of preview images; and
identifying, when there is a change on the postures of the shot object in the multiple frames of preview images, the shot object as the living shot object.

3. The white balance processing method of claim 2, wherein identifying the postures of the shot object in the multiple frames of preview images comprises:
for each frame of preview image, rendering an edge of a body structure of the shot object, the body structure comprising at least one of a mouth, eyes, arms, legs, hands or feet; and
identifying the posture of the shot object according to the rendered edge.

4. The white balance processing method of claim 2, wherein before identifying the postures of the shot object in the multiple frames of preview images, the method further comprises:
acquiring depth information of at least one frame of preview image;
identifying whether the shot object is in a plane form according to the depth information; and
determining that the shot object is in a three-dimensional form.

5. The white balance processing method of claim 4, wherein acquiring the depth information of the at least one frame of preview image comprises:
performing synchronization imaging between a structured light camera or a depth camera and a camera for capturing the preview image to obtain the depth information of the preview image.

6. The white balance processing method of claim 1, wherein calculating the first gain value and the second gain value of each color component according to the area proportion to obtain the white balance gain value comprises:
determining a weight of the first gain value and a weight of the second gain value according to the area proportion; and
performing weighted calculation on the first gain value and the second gain value according to the determined weight of the first gain value and the weight of the second gain value to obtain the white balance gain value.

7. A white balance processing device, comprising a camera and a processor, wherein:
the camera is configured to image a living shot object to obtain an image; and
the processor is configured to:
obtain a white balance gain value according to an area of a target region comprising a face in the image;
perform white balance processing on the image according to the white balance gain value;
determine, when an area occupied by a face region in the image is not less than a preset area threshold, the face region as the target region, or determine, when the area occupied by a face region in the image is less than the preset area threshold, a portrait region in the image as the garget region;
calculate an area proportion of the target region in the image according to the area occupied by the target region in the image; and
calculate a first gain value and a second gain value of each color component according to the area proportion to obtain the white balance gain value, the first gain value being used to regulate the face in the image to a skin color and the second gain value being different from the first gain value.

8. The white balance processing device of claim 7, wherein the camera is configured to preview the shot object to obtain multiple frames of preview images; and
the processor is configured to identify postures of the shot object in the multiple frames of preview images and identify, when there is a change on the postures of the shot object in the multiple frames of preview images, the shot object as the living shot object.

9. The white balance processing device of claim 8, wherein the processor is configured to:
for each frame of preview image, render an edge of a body structure of the shot object, the body structure comprising at least one of a mouth, eyes, arms, legs, hands or feet; and
identify the posture of the shot object according to the rendered edge.

10. The white balance processing device of claim 8, wherein the processor is configured to:
acquire depth information of at least one frame of preview image;
identify whether the shot object is in a plane form according to the depth information; and
determine that the shot object is in a three-dimensional form.

11. The white balance processing device of claim 10, wherein the processor is configured to:
perform synchronization imaging between a structured light camera or a depth camera and the camera for capturing the preview image to obtain the depth information of the preview image.

12. The white balance processing device of claim 7, wherein the processor is configured to:
determine a weight of the first gain value and a weight of the second gain value according to the area proportion; and
perform weighted calculation on the first gain value and the second gain value according to the determined weight of the first gain value and the weight of the second gain value to obtain the white balance gain value.

13. The white balance processing device of claim 7, wherein the second gain value is determined according to the portrait region in the image.

14. A non-transitory computer-readable storage medium, having a computer program stored thereon, wherein the program is executed by a processor to implement a white balance processing method, the method comprising:
imaging a living shot object via a camera to obtain an image;
obtaining a white balance gain value according to an area of a target region comprising a face in the image; and
performing white balance processing on the image according to the white balance gain value, wherein
obtaining the white balance gain value according to the area of the target region comprising the face in the image comprises:
determining, when an area occupied by a face region in the image is not less than a preset area threshold, the face region as the target region; or determining, when the area occupied by the face region in the image is less than the preset area threshold, a portrait region as the target region;

calculating an area proportion of the target region in the image according to the area occupied by the target region in the image; and calculating a first gain value and a second gain value of each color component according to the area proportion to obtain the white balance gain value, the first gain value being used to regulate the face in the image to a skin color and the second gain value being different from the first gain value.

* * * * *